United States Patent

Frederiksen et al.

[11] Patent Number: 5,546,267
[45] Date of Patent: Aug. 13, 1996

[54] COMMUNICATION CIRCUIT PROTECTOR

[75] Inventors: Bjarne Frederiksen, Lombard; Mohammad Masghati, Addison, both of Ill.

[73] Assignee: Illinois Tool Works Inc., Glenview, Ill.

[21] Appl. No.: 351,938

[22] Filed: Dec. 8, 1994

[51] Int. Cl.[6] .................................................. H02H 1/00
[52] U.S. Cl. .............................. 361/119; 361/56; 361/91; 361/93
[58] Field of Search .............................. 361/119, 56, 91, 361/118, 93, 127

[56] References Cited

U.S. PATENT DOCUMENTS

| | | | |
|---|---|---|---|
| 4,171,857 | 10/1979 | Forberg et al. | 339/97 |
| 4,281,885 | 8/1981 | Forberg et al. | 339/14 |
| 4,283,103 | 8/1981 | Forberg et al. | 339/59 |
| 4,345,294 | 8/1982 | Forberg et al. | 361/119 |
| 4,410,225 | 10/1983 | Stoewe et al. | 339/31 R |
| 4,420,792 | 12/1983 | Hegner et al. | 361/331 |
| 4,541,682 | 9/1985 | Gerke et al. | 339/111 |
| 4,634,209 | 1/1987 | Forberg et al. | 339/147 R |
| 4,741,711 | 5/1988 | Singer, Jr. | 439/620 |
| 4,922,374 | 5/1990 | Mueller | 361/119 |
| 5,341,269 | 8/1994 | Hayward | 361/119 |

*Primary Examiner*—Jeffrey A. Gaffin
*Assistant Examiner*—Stephen Jackson
*Attorney, Agent, or Firm*—Schwartz & Weinrieb

[57] ABSTRACT

A communication circuit protector is provided for use with connector blocks in telecommunication equipment. The circuit protector includes a uniquely-designed two-piece interfitting housing for accommodating a variety of protector circuits to provide different kinds of over-voltage and/or overcurrent protection while using the same housing. The housing is adapted to plug-in or to be inserted into the connector clips of a Krone-style terminal block. The side of the housing is provided with means for retaining a side ground contact which is connectible to one of the grounding tab members of the grounding bar of the connector block. In a preferred embodiment, the protector circuit includes a diode bridge rectifier, a pair of voltage suppressors, and a pair of sneak current fuses.

20 Claims, 7 Drawing Sheets

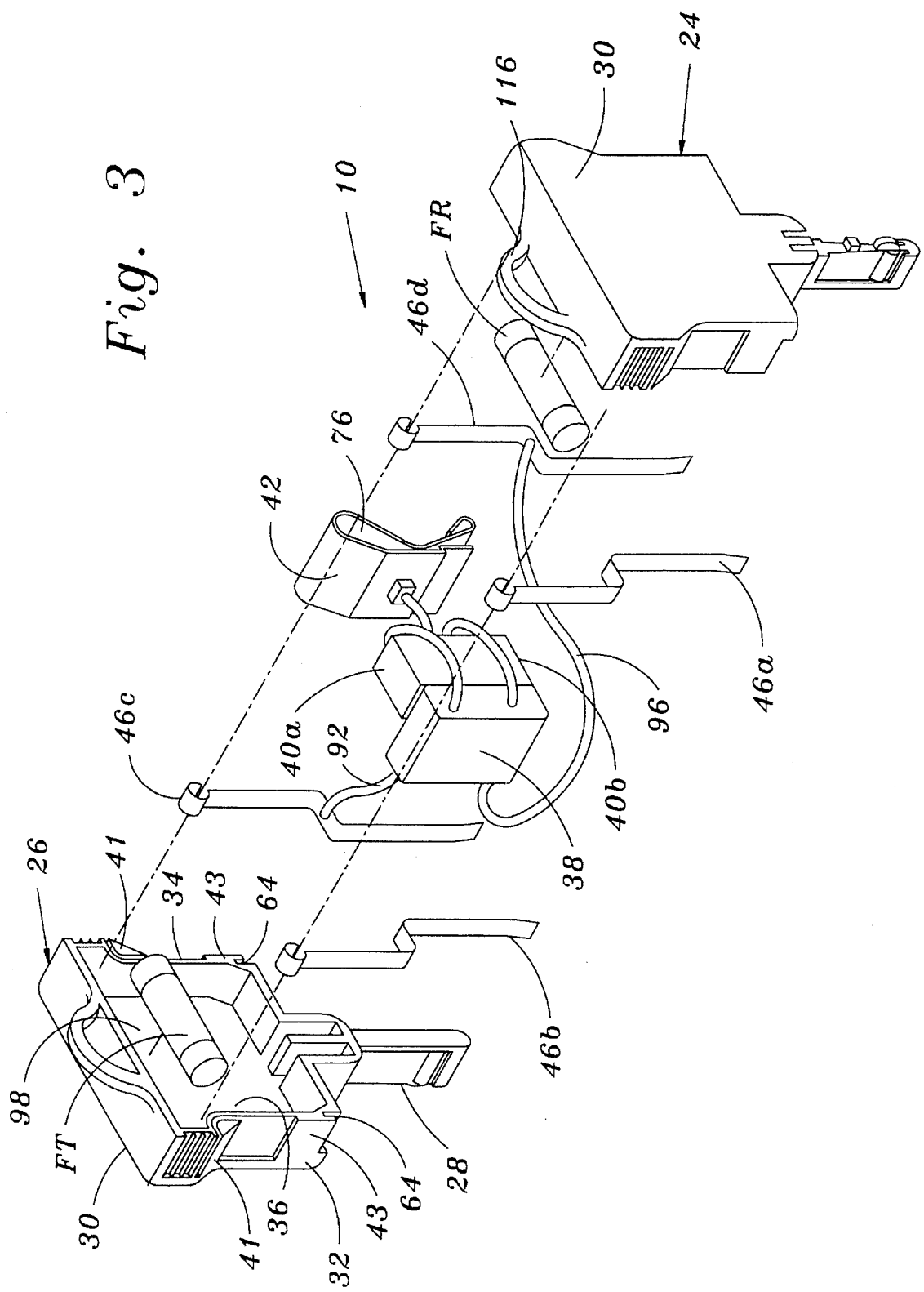

COMMUNICATION CIRCUIT PROTECTOR

FIELD OF THE INVENTION

This invention relates generally to overload protection devices and more particularly, it relates to an improved communication circuit protector for use with connector blocks in telecommunication equipment which includes a uniquely-designed two-piece interfitting housing for accommodating a variety of protector circuits to provide different kinds of overvoltage and/or over-current protection all using the same housing.

BACKGROUND OF THE INVENTION

As is generally known in the art of telecommunication equipment, there has been used extensively a certain connector block with dual terminals for multiple wire conductor pairs, such as 20 conductors in 10-double pairs, referred to sometimes as a "Krone-style connector block" that provides for rapid wiring installation of key telephone systems, PBX systems, cables, and other terminal equipment. Typically, these Krone-style connector blocks are formed as a part of a modular plug connector which is fixed to a back mount frame secured to distribution frame members for distributing or cross-connecting incoming telecommunication lines.

It is also generally known that telephone communication equipment operates on relatively low voltages and is sometimes exposed to transient voltages of considerably higher levels than the normal operating voltages. For instance, this may be caused by a lightning strike, by short circuiting with a high voltage line, or by other circumstances. Therefore, the Krone-style connector blocks are designed to receive protector units with overvoltage and overcurrent protection devices so as to protect the expensive internal telecommunication equipment connected to the output side of a terminal circuit. Thus, the connector block includes a first or unprotected side for receiving connections to outside/incoming lines and a second or protected side for receiving connections to internal lines coupled to the telecommunication equipment to be protected, and terminal means so that the protector units can be plugged therein to provide the protection against overvoltage and/or over current conditions.

There exists in the prior art a number of plug-in structures for use with telecommunication connector blocks to provide connection thereto, including electrical components for protecting against overvoltage and overcurrent conditions, which appear to be best exemplified in the following U.S. Pat. Nos.: 4,171,857; 4,281,885; 4,283,103; 4,345,294; 4,410,225; 4,420,792; 4,541,682; and 4,741,711. All of these patents except for the '711 patent are assigned to Krone GmbH. The '711 patent is assigned to ADC Telecommunications, Inc.

In U.S. Pat. No. 4,281,885 issued on Aug. 4, 1981, there is shown a line communications cable end system for supporting and fixing a lead-in end and for mounting a terminal and/or isolating strips. The system includes at least one pair of spaced, parallel earthing strips 1, 1' each of which has a row of tags 1d formed integrally on the top thereof. The tags extend through the end face of a corresponding number of terminal or isolating strips 2 with LSA contacts and are lengthened so that they can contact associated equipment such as a surge diverter magazine 7.

There is taught in U.S. Pat. No. 4,345,294 issued on Aug. 17, 1982, a modular exchangeable overvoltage arrester device for terminal or junction blocks in telecommunication equipment which is adapted to accommodate a plurality of different laterally adjacent overvoltage arresters. The arrester device includes a plug-in type housing formed of a base and a removable top attached to the base. A plurality of contact blades project from the housing for making external electrical interconnections. The housing top selectively receives a plurality of different switch prongs and earth bars in order to form different versions of the housing.

In U.S. Pat. No. 4,410,225 issued on Oct. 18, 1983, there is disclosed a universal connector which includes a housing formed of two identical shell halves 2, 2a. Contact blades 3, 3a or a printed circuit board 4 are retained within the housing shell halves with the aid of various inserts 10.

In U.S. Pat. No. 4,420,792 issued on Dec. 13, 1983, there is disclosed a plug-in connector with arresters 1 for separating blocks which includes a cartridge-type housing 20 of insulating material having receptacles for the arresters 1. Each of the arresters is connected through a respective fuse element 11 and an earth contact 3 to an earth strip 7 and is exchangably retained within the receptacle by means of compression springs 10.

There is taught in U.S. Pat. No. 4,634,209 issued on Jan. 6, 1987, a modular plug connector for a multiplicity of cable conductor wires for communication apparatus which includes slide-in units 4 engagable with grooves 67 formed in modules 1, 2 and 3. The slide-in units 4 are adapted to provide a number of different functions, such as functioning either as an overvoltage protection device, an overcurrent protection device, or a thermal overload protection device.

Finally, in U.S. Pat. No. 4,741,711 issued on May 3, 1988, there is illustrated a modular distribution frame 10 which includes a modular block 20 having first and second parallel rows of wire connectors 46 with apertures 44. The wire connectors have a wire terminating end and a spring contact finger end 50. The spring contact finger end of opposing connectors extend into the apertures of a releasable electrical contact. An overload protector element 32 is provided and is adaptable for insertion into the aperture extending between opposing spring fingers so as to electrically separate the fingers. The overload protector element includes circuitry to provide electrical connection between the opposing wire connectors through the element. In FIG. 11, there is shown a schematic of the electrical components consisting of a gas overvoltage discharge element 140'; current fuses 200, 201; and bipolar Zener diodes 204, 205 so as to provide both overvoltage and overcurrent protection.

The present invention represents additional improvements over the prior art overload protectors as discussed in the aforementioned '885, '294, '225, '792, '209, and '711 patents. More specifically, the present invention provides a communication circuit protector for use with connector blocks in telecommunication equipment which includes a two-piece interfitting housing for accommodating a variety of protector circuits to provide different kinds of overvoltage and/or overcurrent protection all using the same housing. The housing is uniquely designed so as to plug-in or be inserted into the connector clips of a Krone-style connector block. Further, the side of the housing is provided with means for retaining a side ground contact which is connectible to one of the tab members in the grounding bar of the connector block.

OBJECTS OF THE INVENTION

Accordingly, it is a general object of the present invention to provide a novel and improved communication circuit protector for use with connector blocks in telecommunication equipment which is relatively simple and economical to manufacture and assemble and which is of a more compact configuration than has been traditionally available.

It is an object of the present invention to provide a communication circuit protector for use with connector blocks in telecommunication equipment which includes a uniquely-designed two-piece interfitting housing for accommodating a variety of protector circuits to provide different kinds of overvoltage and/or overcurrent protection all using the same housing.

It is another object of the present invention to provide a communication circuit protector which is characterized by a design which greatly facilitates manufacturing, assembly, and installation thereof.

It is still another object of the present invention to provide a communication circuit protector which is particularly useful for purposes of insertion into connector clips of a Krone-style connector block for accommodating a plurality of different protector circuits.

SUMMARY OF THE INVENTION

In a preferred embodiment of the present invention, there is provided a communication circuit protector for use with connector blocks in telecommunication equipment which includes a housing formed of an upper body portion and a lower terminal portion. Overload protection devices are disposed in the body portion of the housing means for protection against overvoltage and/or overcurrent. The overload protection devices include a plurality of different protection circuits of which one is selectively arranged in the body portion to protect against either overvoltage, overcurrent, or both. A plurality of terminal/fuse contacts are also disposed within the body portion and extend downwardly from the lower terminal portion. A side ground contact is disposed on the external side of the housing for connection to one of a plurality of tab members formed on a grounding bar.

BRIEF DESCRIPTION OF THE DRAWINGS

These and other objects and advantages of the present invention will become more fully apparent from the following detailed description when read in conjunction in which the accompanying drawings with like reference numerals indicate corresponding parts throughout, and wherein:

FIG. 3 is an exploded perspective view of the communication circuit protector of FIG. 1, illustrating the electrical components in the schematic diagram of FIG. 11;

DESCRIPTION OF THE PREFERRED EMBODIMENT

Figure 1:
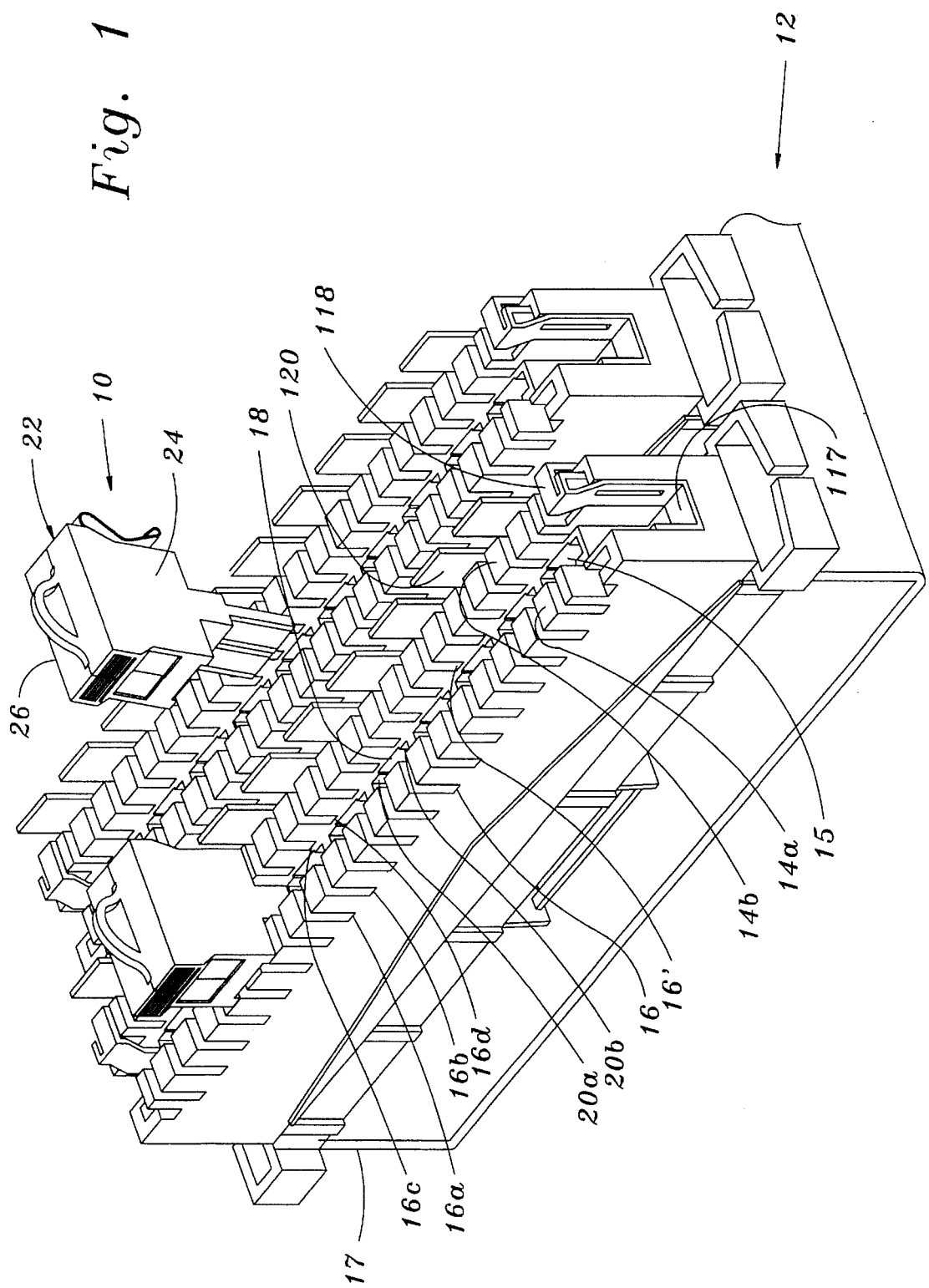
FIG. 1 is a perspective view of a Krone-style connector block into which the communication circuit protector of the present invention is inserted.

Referring now in detail to the various views of the drawings and in particular to FIGS. 1 through 5, there is shown a communication circuit protector of the present invention which is designated generally by reference numeral 10 and which is intended for physical and electrical association with a telephone terminal block 12, referred to as a "Krone-style connector block," in common use in telecommunication equipment and other electronic applications. The terminal block 12 is formed of two parallel rows of terminals 14a and 14b which are spaced apart from each other to form a channel 15 therebetween. A plurality of the terminal blocks 12 (two of which are shown) are adapted to be secured to a U-shaped mounting bracket 17.

Each of the rows of terminals 14a and 14b is provided with a plurality of wire connectors 16 or 16'. The wire connectors 16 in the row 14a are disposed in alignment with opposed wire connectors 16' in the corresponding row 14b. Corresponding adjacent pairs of the wire connectors, that is, 16a and 16b, in the row 14a and adjacent pairs of the opposed wire connectors, that is, 16c and 16d, in the row 14b are grouped together so as to form an individual terminal circuit. Thus, the terminal block 12 provides ten individual terminal circuits.

In this case, the wire connectors 16a and 16b define a first or unprotected input side of the terminal circuit for connection to outside or incoming lines. The wire connectors 16c and 16d define a second or protected output side of the terminal circuit for connection to internal telecommunication equipment which is to be protected. Within the channel 15, there are provided ten openings 18 each containing a pair of spring-like connector clips 20a and 20b which are associated with a corresponding one of the terminal circuits. The communication circuit protector 10 is suitably insertable into one of the openings 18 and interconnects with an associated one of the pairs of connector clips 20a and 20b.

The communication circuit protector 10 can provide a variety (four) of different protector circuits so as to protect against overvoltage, overcurrent, or both because it can accommodate a number of different electrical components. The communication circuit protector includes a molded housing 22 made of a suitable plastic material, such as nylon of the like, and is comprised of two comating front and back halves 24 and 26. The two halves are identical parts which are assembled to each other and are ultimately sonically welded together. The housing 22 includes a lower terminal portion 28 and an upper body portion 30. The terminal portion 28 is adapted to be plugged into the connector clips 20a, 20b in the opening 18 of the Krone-style terminal block 12 during use.

The front and back halves 24 and 26 are provided with outer confronting and interfitting side wall members 32 and 34, respectively. The side wall members 32 and 34 are recessed at 36 so as to receive and enclose a pair of sneak current fuses FT and FR, a diode bridge rectifier 38, and a pair of solid-state voltage suppressors such as SIDACtor™ (a trademark of Teccor Electronic, Inc. of Irving, Tex.), transient surge protectors 40a and 40b, or any number of different electrical components in order to provide overvoltage and/or overcurrent protection while using the same housing 22. A side ground contact 42 is provided for reasons that will become apparent which interconnects with one end of the voltage suppressors 40a, 40b and which mounts to the external side of the housing 22 by means of small fingers 41 and tabs 43 formed on the side walls 32 and 34. Adjacent each internal wall surface 44 of the front and back halves 24 and 26, there are provided in the housing 22 four tip/ring terminal/fuse contacts 46a, 46b, 46c, and 46d.

Figure 6:
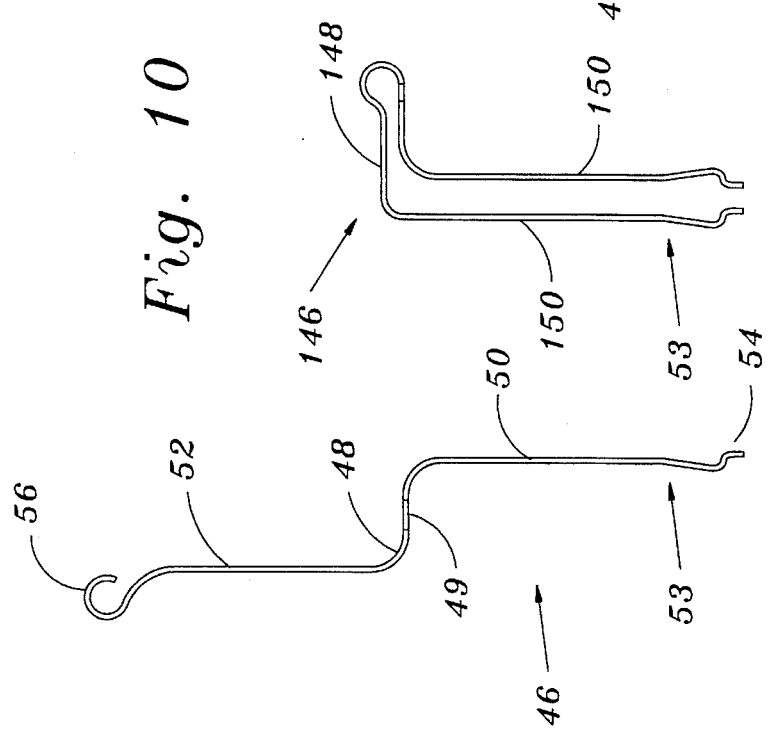
FIG. 6 is a side view of the tip/ring terminal/fuse contact.

The tip/ring terminal/fuse contacts 46a–46d shown in FIG. 3 are all identical in their construction and one of them (46) is shown in full detail in FIG. 6. The terminal/fuse contacts 46a–46d are preferably formed from phosphor-bronze strip metal and tin plated for solderability and to improve corrosion resistance. Each of the terminal/fuse contacts 46a–46d comprises an integral strip metal stamping and includes a substantially horizontal body portion 48 which has connected integrally at its right end a vertical and downwardly extending lower leg portion 50. At the opposite or left end of the horizontal body portion 48, there is provided a vertical and upwardly extending upper leg portion 52. The leg portion 50 terminates in a bump 53 and an inwardly directed tip portion 54. The upper leg portion 52 terminates in an arcuate-shaped fuse-engaging portion 56. The horizontal body portion 48 is also formed with a cut-out 49 on its one side for receiving therein one end of a jumper wire.

Figures 7, 8, 9:
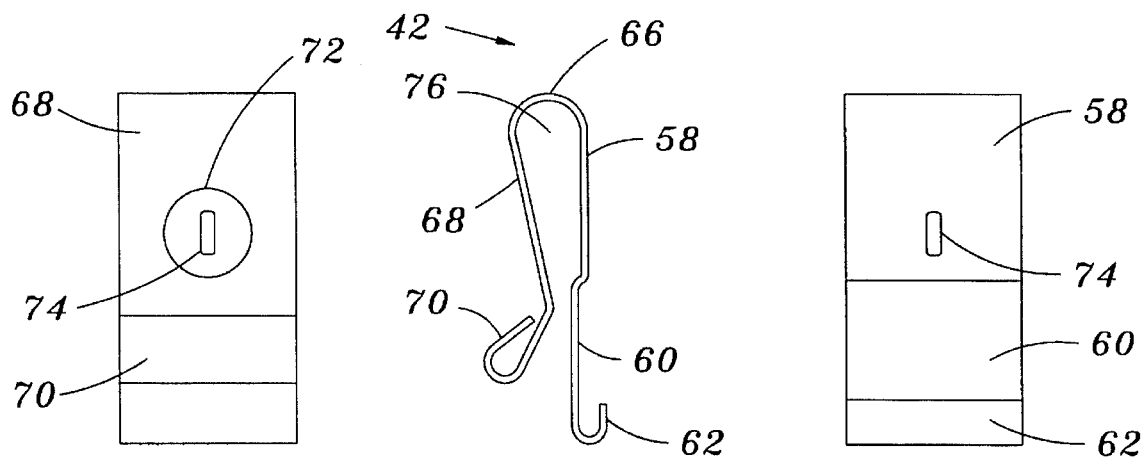
FIG. 7 is a front view of the side ground contact.
FIG. 8 is a side view of the side ground contact of FIG. 7.
FIG. 9 is a back view of the side ground contact of FIG. 7.

The side ground contact 42 is stamped from nonferrous sheet metal and is likewise made from a phosphorbronze strip metal similar to the tip/ring terminal/fuse contact 46 and is tin plated for solderability and to improve corrosion resistance. The inverted U-shaped side ground contact 42 is shown in FIG. 3 and is illustrated in full detail in FIGS. 7–9. In the latter drawings, the side ground contact 42 can be seen to include an upstanding flange 58 and an off-set leg portion 60 joined integrally to the lower end of the upstanding flange. The off-set leg portion 60 terminates in an upwardly directed hook portion 62 which is adapted to fit in cooperating recesses 64 formed in tabs 43 in the side walls 32 and 34 of the housing halves 24 and 26 as seen, for example, in FIGS. 4 and 5.

At the upper end of the upstanding flange 58, there is provided a bight section 66 which is connected integrally thereto. A vertical connecting flange 68 is connected integrally to the left end of the bight section 66 and extends downwardly to the level of the off-set leg portion 60. The vertical connecting flange 68 terminates in a reversely bent portion 70. A circular cut-out 72 is defined in the connecting flange 68, and a narrow slit 74 is defined in the upstanding flange 58. One end of the voltage suppressors 40a, 40b extends through the slit 74 and is soldered thereto. The fingers 41 formed on the side walls of the housing halves 24 and 26 are received within the area 76 defined by the flanges 58 and 68 so as to facilitate mounting of the same as best seen in FIGS. 4 and 5.

Figures 4, 5:
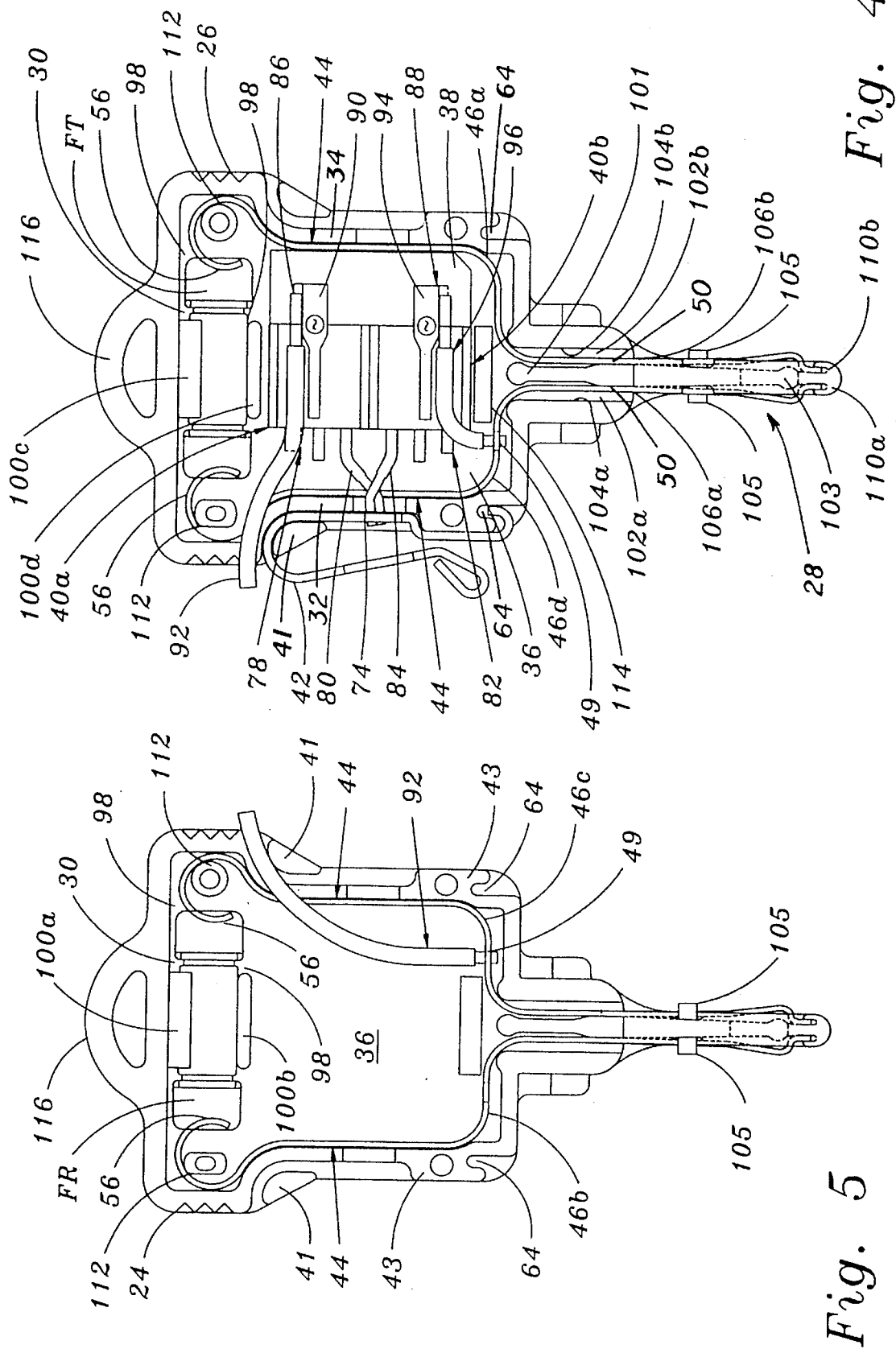
FIG. 4 is a front view of the rear housing half assembled with the electrical components of FIG. 3.
FIG. 5 is a front plan view of the front housing half of FIG. 3.

The transient voltage suppressor 40a has terminal pin leads 78 and 80, and the transient voltage suppressor 40b has terminal pin leads 82 and 84, all as best seen in FIG. 4. The diode bridge rectifier 38 has its terminal lead 86 connected by solder to the terminal pin lead 78 of the voltage suppressor 40a and has its terminal lead 88 connected by solder to the terminal pin lead 82 of the voltage suppressor 40b. The bridge rectifier 38 also has its terminal lead 90 joined by solder to one end of a jumper wire 92 whose other end is soldered to the cut-out 49 in the horizontal body portion 48 of the terminal/fuse contact 46c, as seen in FIG. 5, and has its terminal lead 94 joined by solder to one end of a jumper wire 96 whose other end is soldered to the cut-out 49 in the horizontal body portion 48 of the terminal/fuse contact 46d. The terminal pin leads 80 and 84 of the respective voltage suppressors 40a and 40b are connected together and are inserted through the narrow slit 74 in the connecting flange 58 of the side ground contact 42 and is soldered thereto.

As can be seen from FIGS. 3, 4 and 5, the upper body portion 30 of each one of the front and back housing halves 24 and 26 each includes an upper fuse-receiving cavity 98 which are designed to receive and retain the sneak current fuses FT and FR. The central body portion of each one of the fuses is supported between lateral edges or platforms 100a and 100b or 100c and 100d extending from the housing halves. The end contact areas of the fuses FT and FR are received in snug engagement with the arcuate-shaped fuse-engaging portion 56 of the opposed terminal/fuse contact that is, 46a and 46c; 46b and 46d when they are inserted into a cavity 98.

The lower terminal portion 28 of the housing 22 includes a vertical wall or partition 101 separating two chambers 102a and 102b disposed therein and a stem portion 103 extending downwardly from the partition 101 as best seen in FIG. 4. The chamber 102a is defined by a side wall 104a, a bottom slot 106a, and the vertical partition 101. Similarly, the chamber 102b is defined by a side wall 104b, a bottom slot 106b, and the vertical partition 101.

The lower leg portion 50 of each one of the opposed terminal/fuse contacts 46 extends vertically through the respective slots 106a and 106b and downwardly therefrom in order to be disposed adjacent to the side surfaces of the stem portion 103. The lower distal end of the stem portion 103 is formed with a pair of opposed U-shaped recesses 110a and 110b which contain the respective tip portions 54 of the terminal/fuse contacts 46. It will be noted that the upper leg portion 52 of each terminal/fuse contact 46 rests adjacent to the interior surface 44 of the side walls 32 and 34 of the housing halves 24 and 26 and the fuse-engaging portions 56 of the terminal/fuse contacts 46 are disposed in surrounding relationship on post members 112 formed in the corners of the upper body portion 30 of each housing half 24 and 26. Further, it can be seen that a horizontal rib member 114 is formed adjacent the chambers 102a and 102b so as to retain the leg portion 50 of each terminal/fuse contact 46 therein without vertical or lateral movement. The upper body portion 30 of each housing half 24 and 26 includes on its upper surface a handle member 116 to provide a user with a grip for handling or removal of the circuit protector 10 from the connector clips of the Krone-style terminal block 12. Further, the intermediate area of the stem portion 103 is provided with a horizontal contact support or retainer 105 so as to facilitate contact engagement with the connector clips of the terminal block 12.

Figure 2:
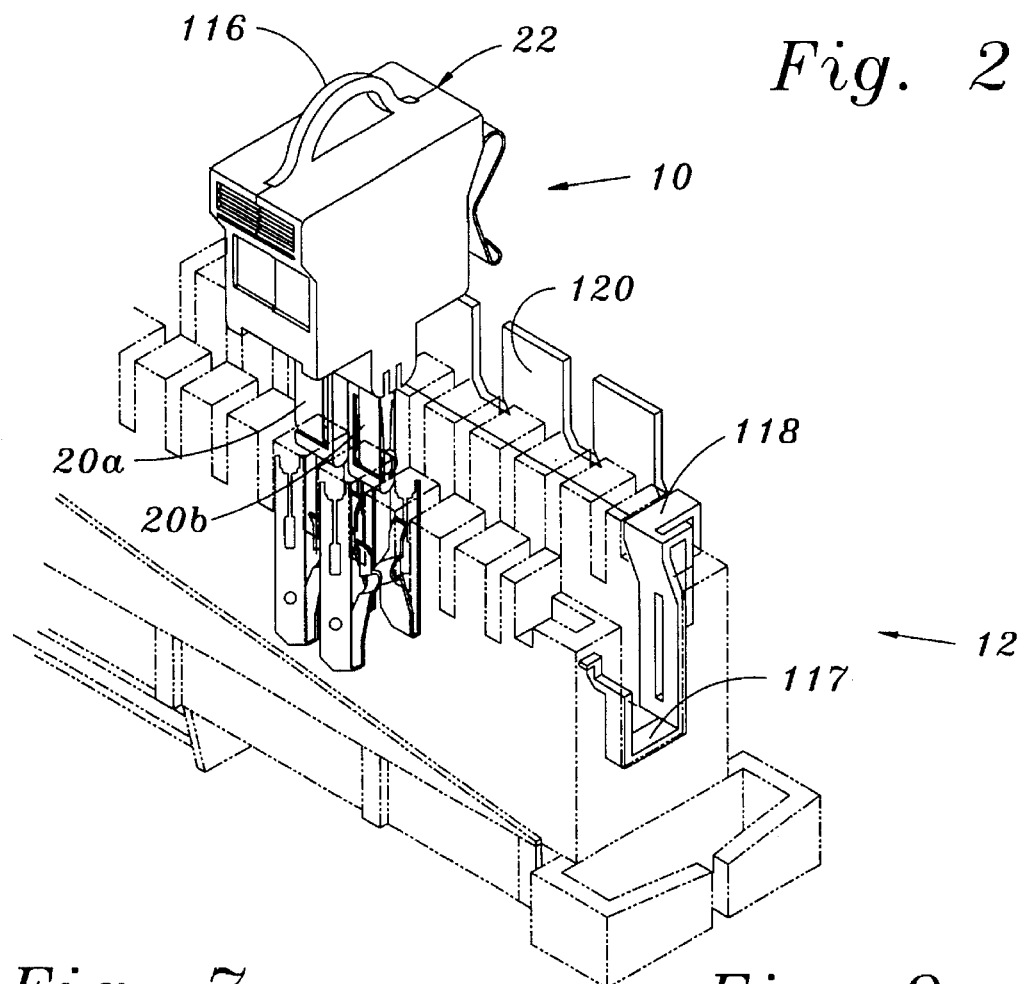
FIG. 2 is an enlarged view of a portion of FIG. 1, illustrating the connection of the side ground contact of the communication circuit protector to the grounding bar.

As shown in FIGS. 1 and 2, the grounding bar associated with the Krone-style terminal block 12 is fabricated from copper or other non-ferrous metal strip and includes an elongated flat horizontal member 118 and a plurality (ten) of grounding tab members 120. The tab members 120 are spaced laterally apart from each other and are formed integrally with the horizontal member 118. The area 76 between the flanges 58 and 68 of the side ground contact 42 is adapted to receive a corresponding one of the tab members 120 therebetween during insertion of the circuit protector 10 into the connector clips 20a, 20b of the terminal block 12. The common bus wire (not shown) may be suitably connected to the U-shaped mounting bracket 17 which the grounding bar 117 and terminal block 12 both engage.

The four terminal/fuse contacts 46a–46d, side ground contact 42, voltage suppressors 40a and 40b, rectifying device 38, and fuses FT and FR are positioned and assembled together between housing half 24 and housing half 26 as shown in FIG. 3. Next, the front housing half 26 is affixed to the back housing half 24 so as to sandwich the components therebetween with the side ground contact 42 disposed on the exterior surface of the side wall. A sonic welding process is used to fixedly secure the two housing halves 24 and 26 together. As the stem portion of the circuit protector 10 is inserted into the corresponding connector clips 20a, 20b of the Krone-style terminal block 12, the area 76 within the associated side ground contact 42 receives one of the tab members 120 of the grounding bar 17 which is mounted in the terminal block 12 and to the U-shaped mounting bracket 17. As a result, the communication circuit protector of FIG. 1 is thus formed to provide overvoltage and overcurrent protection and is illustrated in the schematic diagram of FIG. 11.

Figure 12:
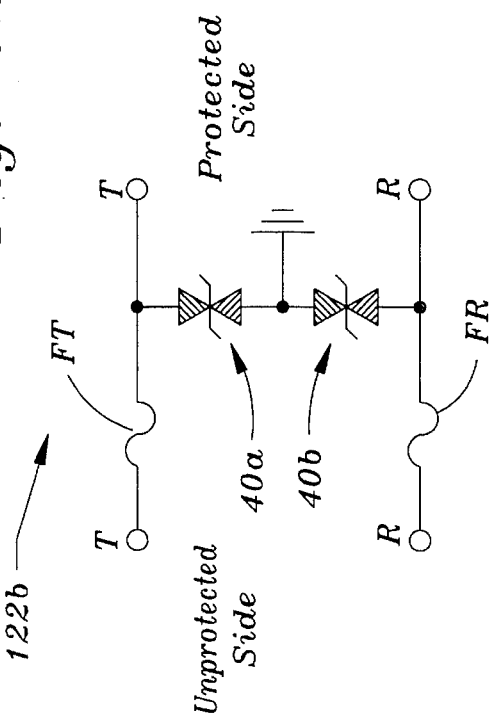
FIG. 12 is an alternate schematic diagram, illustrating the electrical components in a second embodiment employed in connection with the communication circuit protector of the present invention.
Figure 14:
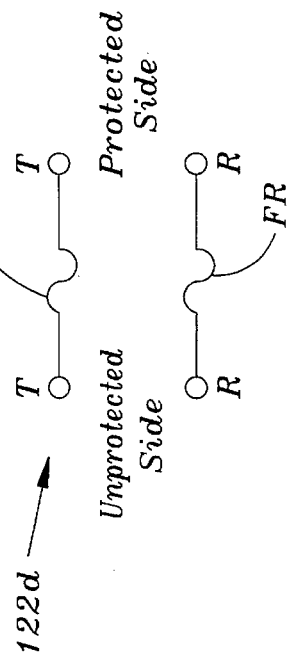
FIG. 14 is another alternate schematic diagram, illustrating the circuit components in a fourth embodiment employed in connection with the communication circuit protector of the present invention.
Figure 11:
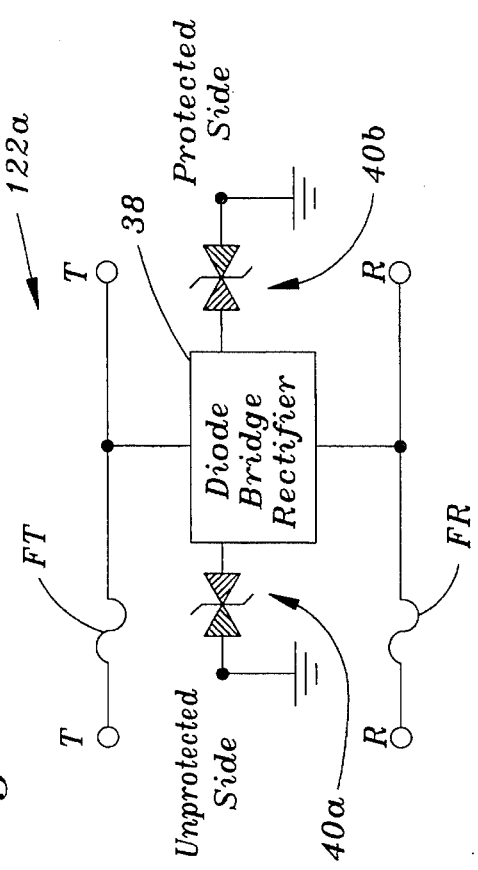
FIG. 11 is a schematic diagram, illustrating the electrical components in a first embodiment employed in connection with the communication circuit protector of the present invention.
Figure 13:
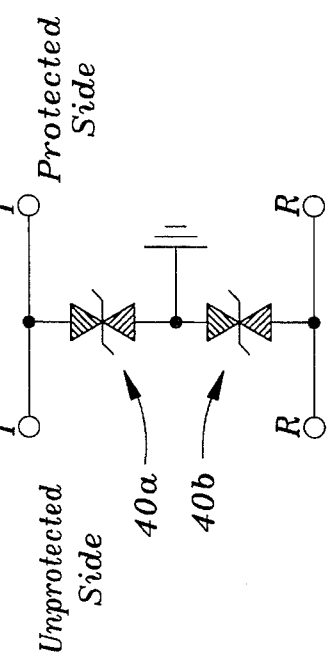
FIG. 13 is another alternate schematic diagram, illustrating the components in a third embodiment employed in connection with the communication circuit protector of the present invention.

It should be understood that the first protector circuit 122a in FIG. 11 serves to provide both over-voltage and overcurrent protection for a high speed or frequency circuit. However, the diode bridge rectifier in FIG. 11 may be eliminated in order to still provide both overvoltage and overcurrent protection for a circuit of reduced speed. A schematic diagram of this second protector circuit 122b is illustrated in FIG. 12. Further, the surge current fuses FT and FR in FIG. 12 can be eliminated in order to provide only overvoltage protection. A schematic diagram of this third protector circuit 122c is illustrated in FIG. 13. Alternatively, the voltage suppressors 40a and 40b in FIG. 12 can be eliminated in order to provide only overcurrent protection. A schematic diagram of this fourth protector circuit 122d is depicted in FIG. 14.

Figures 19, 20:
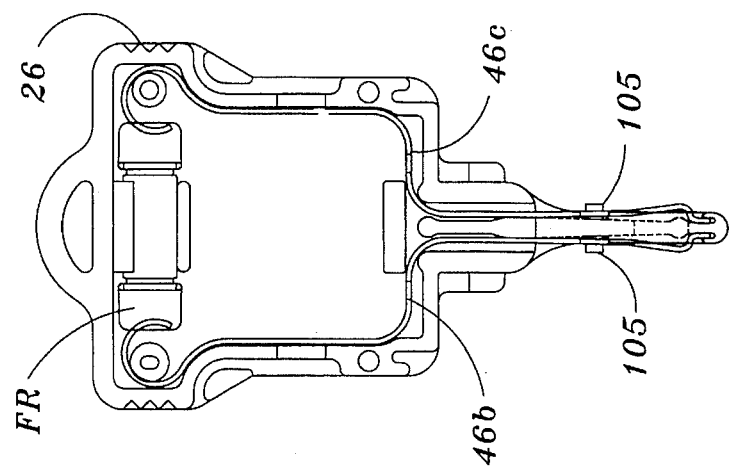
FIG. 19 is a view similar to FIG. 4, but illustrating certain ones of the components in the schematic diagram of FIG. 14.
FIG. 20 is a view similar to FIG. 5, but illustrating certain ones of the components in the schematic diagram of FIG. 14.
Figure 17:
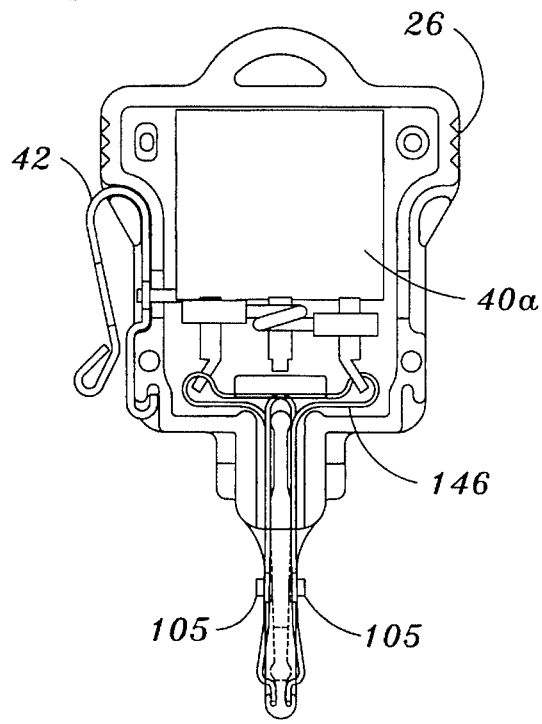
FIG. 17 is a view similar to FIG. 4, but illustrating certain ones of the components in the schematic diagram of FIG. 13.
Figure 18:
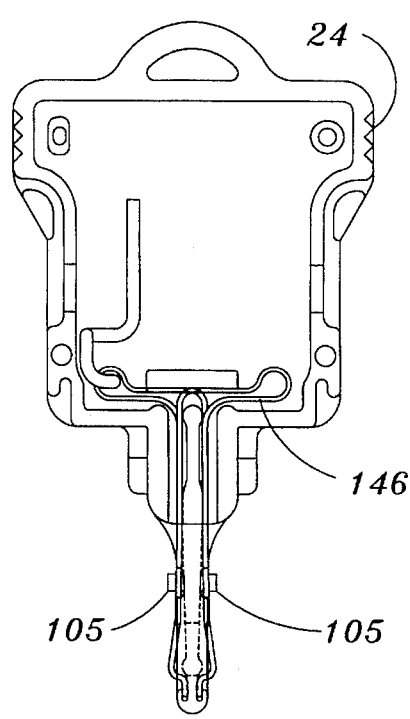
FIG. 18 is a view similar to FIG. 5, but illustrating certain ones of the components in the schematic diagram of FIG. 13.
Figure 15:
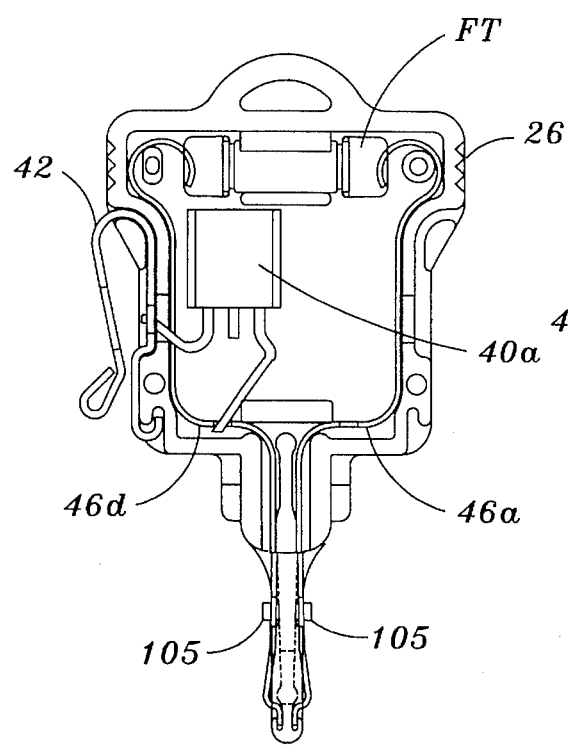
FIG. 15 is a view similar to FIG. 4, but illustrating certain ones of the electrical components in the schematic diagram of FIG. 12.
Figure 16:
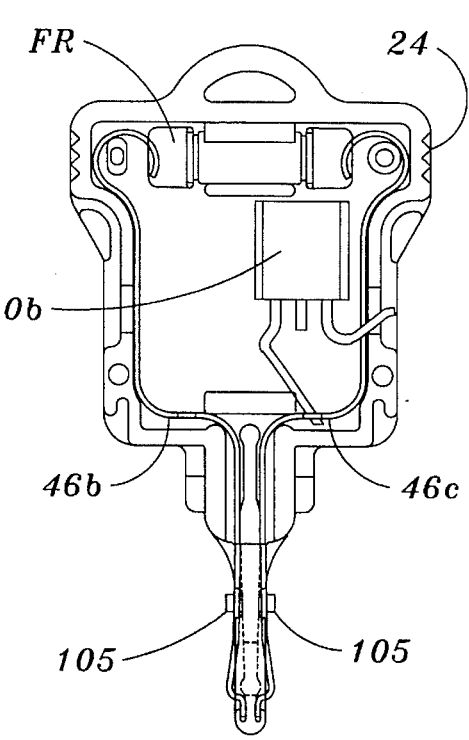
FIG. 16 is a view similar to FIG. 5, but illustrating certain ones of the components in the schematic diagram of FIG. 12.

FIGS. 15 and 16 are similar to respective FIGS. 4 and 5, but illustrate the electrical components in the schematic diagram of FIG. 12. FIGS. 17 and 18 are also similar to respective FIGS. 4 and 5, but illustrate the electrical components in the schematic diagram of FIG. 13. FIGS. 19 and 20 are likewise similar to respective FIG. 4 and 5, but illustrate the electrical components in the schematic diagram of FIG. 14. It will be noted that the front and back halves in FIGS. 15 through 20 are all identical to the same front and back housing halves 24 and 26 of FIG. 3. The only difference between FIGS. 4 and 5 and FIGS. 15–20 is that the same housing halves are used to accommodate different kinds of protector circuits.

Figure 10:
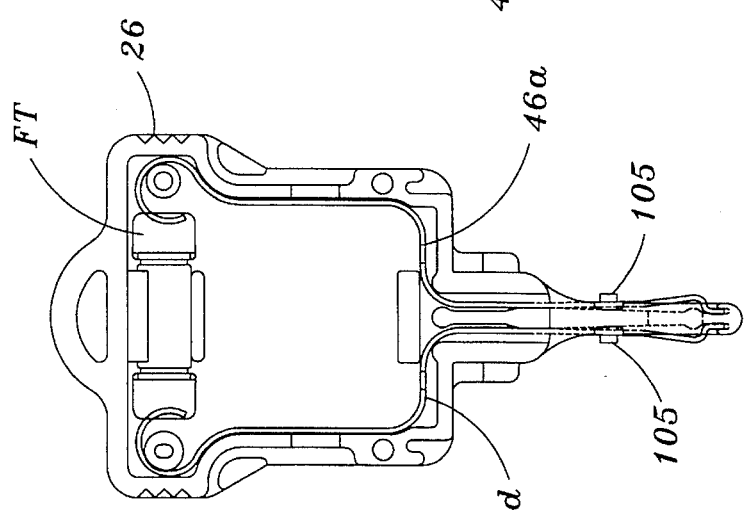
FIG. 10 is a side view of the tip/ring primary terminal contact.

When the protector circuit includes components which provide overvoltage protection, the side ground contact 42 and the grounding bar 117 are required so as to interconnect one of the ends of the voltage suppressors to the U-shaped mounting bracket and to the external common ground bus. Thus, the protector circuits 122a, 122b, and 122c in protective FIGS. 11–13 all include the side ground contact 42 and the grounding bar 117. In the event that only overvoltage protection is desired as shown in the protector circuit 122c of FIG. 13, a tip/ring terminal/fuse contacts 46a and 46d in the front and back housing halves are replaced with a simplified primary terminal contact 146, which is depicted in FIG. 10. It will be noted that the primary terminal contact 146 closely resembles the contact 46, except the upper leg portion 52 and the fuse-engaging portion 56 have been eliminated and a horizontal connection portion 148 has been substituted therefor for joining the lower leg portions 150 together. When only overcurrent protection is desired, as shown in the protector circuit 122d of FIG. 14, the side ground contact 42 is removed.

From the foregoing detailed description, it can thus be seen that the present invention provides an improved communication circuit protector for use with connector blocks in telecommunication equipment which includes a two-piece interfitting housing for accommodating a variety of protector circuits to provide different kinds of overvoltage and/or overcurrent protection while using the same housing. The housing is uniquely designed so as to plug-in or be inserted into the connector clips of a Krone-style connector block. Further, the side walls of the housing are provided with means for retaining a side ground contact which is connectible to one of the grounding tab members of a grounding bar of the connector block.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A circuit protector for protecting equipment against overvoltage and overcurrent conditions, comprising:

a housing comprising an upper body portion and a lower body portion;

voltage limiting means and current limiting means for disposition within said upper body portion of said housing for protecting equipment against overvoltage and overcurrent conditions, respectively;

first contact means for disposition within said housing for establishing electrical contact with said current limiting means and said voltage limiting means when overvoltage and overcurrent protection is to be provided in connection with said equipment, and for establishing electrical contact with said current limiting means when only overcurrent protection is to be provided in connection with said equipment; and second contact means for disposition within said housing for establishing electrical contact with said voltage limiting means when only overvoltage protection is to be provided in connection with said equipment.

2. A circuit protector as set forth in claim 1, wherein:

said second contact means comprises a pair of vertically extending leg portions disposed substantially parallel to each other, a pair of horizontally extending portions disposed substantially parallel to each other and respectively connected to said pair of vertically extending leg portions, and a loop portion integrally connecting said pair of horizontally extending portions together.

3. A circuit protector as claimed in claim 1, wherein said housing includes a pair of co-mating front and back halves.

4. A circuit protector as claimed in claim 3, wherein:

each one of said front and back halves of said housing includes handle means formed upon its top surface for facilitating handling, installation, and removal of said circuit protector with respect to said equipment being protected.

5. A circuit protector as set forth in claim 1, further comprising:

a side ground contact disposed upon an external side wall of said housing.

6. A circuit protector as claimed in claim 5, further comprising:

mounting means comprising fingers and tabs disposed upon said external side wall of said housing for retaining said side ground contact thereon.

7. A circuit protector as claimed in claim 1, wherein:

said voltage limiting means comprises a pair of voltage suppressors; and said current limiting means comprises a pair of sneak current fuses.

8. A circuit protector as claimed in claim 7, further comprising:

a diode bridge rectifier electrically connected to said pair of voltage suppressors.

9. A circuit protector as claimed in claim 7, wherein:

said first contact means comprises a horizontal body portion, a lower leg portion, an upper leg portion, and an arcuate-shaped fuse-engaging portion, all integrally connected together.

10. A circuit protector as claimed in claim 9, wherein:

said lower body portion of said housing includes chamber means and a stem portion extending downwardly from said chamber means, said stem portion having a pair of opposed U-shaped recesses for retaining said lower leg portion of said first contact means.

11. A circuit protector as claimed in claim 1, wherein:

said voltage limiting means comprises a pair of voltage suppressors; and said current limiting means comprises a pair of sneak current fuses.

12. A communication circuit protector as claimed in claim 11, further comprising:

a diode bridge rectifier electrically connected to said pair of voltage suppressors.

13. A circuit protector as set forth in claim 11, wherein:

said second contact means comprises a pair of vertically extending leg portions disposed substantially parallel to each other, a pair of horizontally extending portions disposed substantially parallel to each other and respectively connected to said pair of vertically extending leg portions, and a loop portion integrally connecting said pair of horizontally extending portions together.

14. A communication circuit protector as claimed in claim 11, wherein said housing means includes a pair of co-mating front and back halves.

15. A communication circuit protector as claimed in claim 14, wherein:

each one of said front and back halves of said housing means includes handle means formed upon its top surface for facilitating handling, installation, and removal of said circuit protector with respect to said connector block operatively associated with said telecommunication equipment being protected.

16. A circuit protector as set forth in claim 11, further comprising:

a side ground contact disposed upon an external side wall of said housing means for connection to one of a plurality of grounding tab members provided upon a grounding bar operatively mounted upon said connector block.

17. A communication circuit protector as claimed in claim 13, further comprising:

mounting means comprising fingers and tabs disposed upon said side wall of said housing means for retaining said side ground contact thereon.

18. A communication circuit protector as claimed in claim 11, wherein:

said voltage limiting means comprises a pair of voltage suppressors; and said current limiting means comprises a pair of sneak current fuses.

19. A communication circuit protector as claimed in claim 18, wherein:

said first contact means comprises a horizontal body portion, a lower leg portion, an upper leg portion, and an arcuate-shaped fuse-engaging portion, all integrally connected together.

20. A communication circuit protector as claimed in claim 19, wherein:

said lower terminal portion of said housing means includes chamber means and a stem portion extending downwardly from said chamber means, said stem portion having a pair of opposed U-shaped recesses for retaining said lower leg portion of said first contact means.

* * * * *